United States Patent
Daniel

(12) 
(10) Patent No.: US 6,284,130 B1
(45) Date of Patent: Sep. 4, 2001

(54) FILTER CARTRIDGE WITH CLEAN SIDE ANTI-DRAINBACK VALVE

(75) Inventor: Dieter Daniel, Gastonia, NC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/244,517

(22) Filed: Feb. 4, 1999

(51) Int. Cl.⁷ ..................... B01D 35/147; B01D 35/153
(52) U.S. Cl. ..................... 210/136; 210/430; 210/440; 137/543.17
(58) Field of Search ................. 137/541, 543.17, 137/540, 515.5; 210/136, 429, 430, 440, 234

(56) References Cited

U.S. PATENT DOCUMENTS

| | | | |
|---|---|---|---|
| 287,007 | * | 10/1883 | Cullingworth . |
| 729,027 | * | 5/1903 | Wilson . |
| 743,006 | * | 11/1903 | Loucks . |
| 2,072,271 | * | 3/1937 | Meadows . |
| 3,042,215 | * | 7/1962 | Gruner . |
| 3,184,062 | | 5/1965 | Humbert, Jr. . |
| 3,231,089 | | 1/1966 | Thornton . |
| 3,305,095 | | 2/1967 | Hathaway . |
| 3,369,666 | | 2/1968 | Hultgren et al. . |
| 3,590,851 | * | 7/1971 | Bogossian . |
| 4,129,144 | * | 12/1978 | Andersson et al. . |
| 4,144,168 | | 3/1979 | Thornton . |
| 5,250,176 | | 10/1993 | Daniel . |
| 5,690,816 | | 11/1997 | Covington . |
| 5,833,843 | | 11/1998 | Covington . |
| 5,971,016 | * | 10/1999 | Wass et al. . |
| 6,027,640 | | 2/2000 | Covington et al. . |
| 6,050,295 | * | 4/2000 | Meisinger et al. . |

\* cited by examiner

Primary Examiner—W. L. Walker
Assistant Examiner—Terry K. Cecil
(74) Attorney, Agent, or Firm—Millen, White, Zelano & Branigan, P.C.

(57) ABSTRACT

Described is a filter cartridge having a clean side anti-drainback valve. The filter cartridge includes an annular filter element having a hollow core with an annular valve support 40 disposed therein. The clean side anti-drainback valve includes a valve 60 and an annular valve seat 70 having a base, a central opening, and a peripheral flange 82. The peripheral flange is mounted atop an upper surface 90 of the annular valve support such that the central opening is in alignment with the passage 50 leading out of the filter cartridge. The valve 60 is mounted on the valve seat and is biased by a coil spring to a normally closed position so that when the engine is not running clean side oil is retained within the filter cartridge. A dirty side anti-drainback valve can also be included.

12 Claims, 4 Drawing Sheets

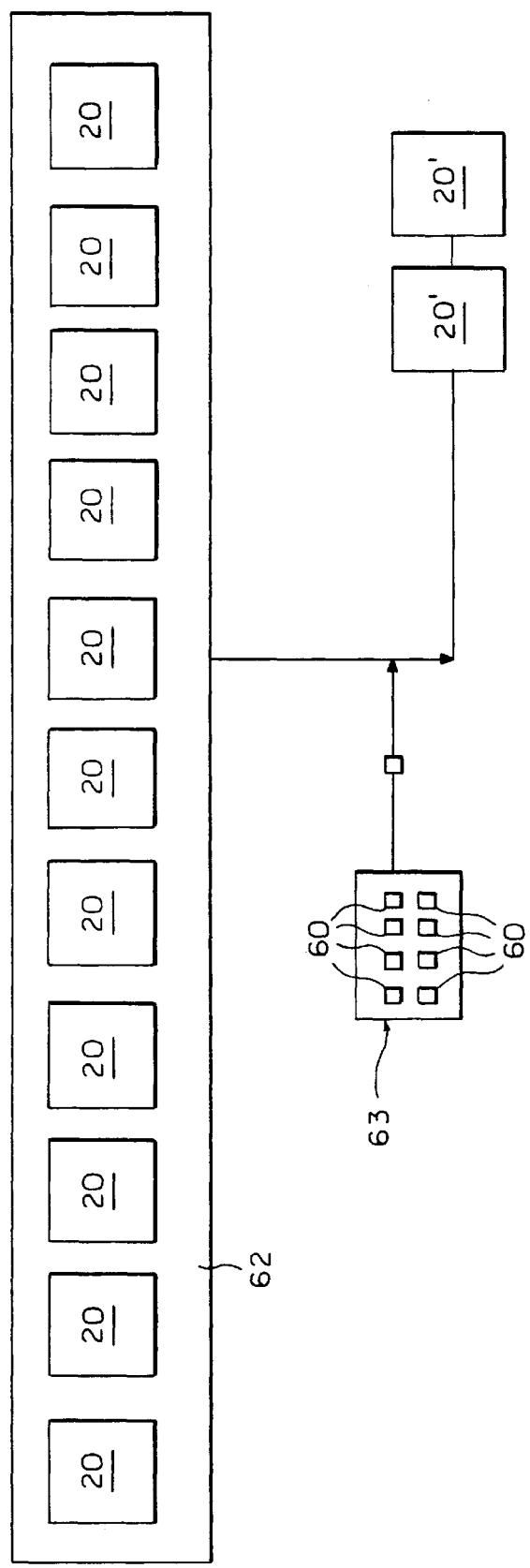

FILTER CARTRIDGE WITH CLEAN SIDE ANTI-DRAINBACK VALVE

FIELD OF THE INVENTION

The present invention is directed to a clean side anti-drainback valve and to a kit employing a clean side anti-drainback valve. More particularly, the present invention is directed to such a valve and kit for use with internal combustion engines.

BACKGROUND OF THE INVENTION

Typically, internal combustion engines utilize filters having a filter media which removes harmful particles from lubricating oil. When the filter media becomes clogged, it is desirable to change the filter, but, for one reason or another, many filters are not changed upon becoming clogged. The engine will still need to be lubricated so filters are typically provided with bypass valves. When the engine is not running, the oil is not under pressure and will therefore tend to drain back into the engine so that when the engine is again started, oil is not initially pulled from the filter element because the filter element is empty. During the time it takes to circulate oil through the filter element, there is a risk of the engine not being lubricated for a very short interval. During that short interval, the engine may suffer slight wear. A minimal number of short intervals is not significant, but as the engine is started repeatedly, the amount of time that sufficient lubricating oil is unavailable because the filter has been drained, can become rather lengthy and thus result in engine damage. In order to prevent this, dirty side anti-drainback valves are employed.

However, even when dirty side anti-drainback valves are employed, there is an opportunity for wear because clean side oil in the hollow core of the filter element has been allowed to drain away and thus there is an interval when insufficient lubricating oil is available during engine starts. Consequently, it is advisable with some engines to provide a clean side anti-drainback valve, as well as a dirty side anti-drainback valve, so that the oil filter does not contribute to engine wear due to voids in oil circulation because clean side oil has drained from the hollow core of the filter element, even though dirty side oil has been retained.

In the manufacture and supply of oil filters, most situations require only oil filters which have a dirty side anti-drainback feature and a bypass feature. Typically, this requires a filter cartridge of a first configuration. There is, however, a demand for filter elements which have both clean side and dirty side anti-drainback capabilities, and thus the manufacturer must stock a separate line of lubricating filters for this purpose. Usually, it is more inconvenient and therefore more expensive to provide two different products, if the parts for those products are not readily interchangeable, because work in process inventory is increased.

SUMMARY OF THE INVENTION

It is a feature of the present invention to provide a new and improved arrangement to facilitate incorporating clean side anti drain back valves in oil filter cartridges which already have dirty side anti-drainback valves and bypass valves disposed therein.

In view of this feature and other features, the present invention is directed to an anti-drainback valve for use with a filter cartridge having an annular filter element supported on an annular valve support defining a passage leading out of the filter cartridge wherein, the anti-drainback valve comprises an annular valve seat having a central opening and a peripheral flange. The annular valve seat is adapted to be mounted on the annular valve support with the central opening in alignment with the passage leading out of the filter cartridge. A valve is mounted on the valve seat for movement between a first position where it closes the passage through the valve seat and a second position in which it opens the passage through the valve seat. A biasing device is disposed between the valve and valve seat for urging the valve to the first position.

In a further aspect the valve seat has a dish portion between the central opening and peripheral flange, which dish portion is adapted to seat within the passage leading out of the filter cartridge with the peripheral flange engaging the annular valve support and extending radially outside of the passage.

In still another aspect the valve comprises a first portion which covers the opening through the valve seat and a second portion which projects axially from the first portion, the second portion including a spring seat which faces the valve seat, wherein the biasing device is a spring disposed between the valve seat and spring seat for urging the valve toward the first portion so that it engages the valve seat to close the opening.

In an additional aspect the valve seat is held on the valve support with the valve seat within the passage leading out of the filter cartridge by positive engagement between an outside surface of the dish portion and an inside surface of the valve support.

The present invention is also directed to a kit comprising a filter cartridge including an annular filter element defining a hollow core disposed in a housing closed by a base plate having a central outlet opening aligned with the hollow core of the filter element. An annular valve support is disposed in axial alignment with a central outlet through the base plate, the annular valve support including a cylindrical outlet passage there through as well as bypass openings. A valve member is mounted on the valve support, the valve member having a dirty-side anti-drainback portion normally closing the inlet openings and a bypass portion normally closing the bypass openings in the valve support. In combination with the filter cartridge is a clean side anti-drainback valve having a valve seat with a central opening. The clean side anti-drain back valve is adapted to be mounted on the valve support with the central opening in alignment with the cylindrical outlet passage of the valve support and with a valve mounted on the valve seat and normally baised to close the central opening in the absence of positive pressure on clean side oil in the hollow core of the filter element.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 3 is a schematic illustration showing an inventory of filter cartridges of the FIG. 1 configuration and an inventory of clean side anti-drainback valves which are optionally incorporated into the filter cartridges of FIG. 1 so as to create a supply of the filter cartridges of FIG. 2;

DETAILED DESCRIPTION

Figure 1:
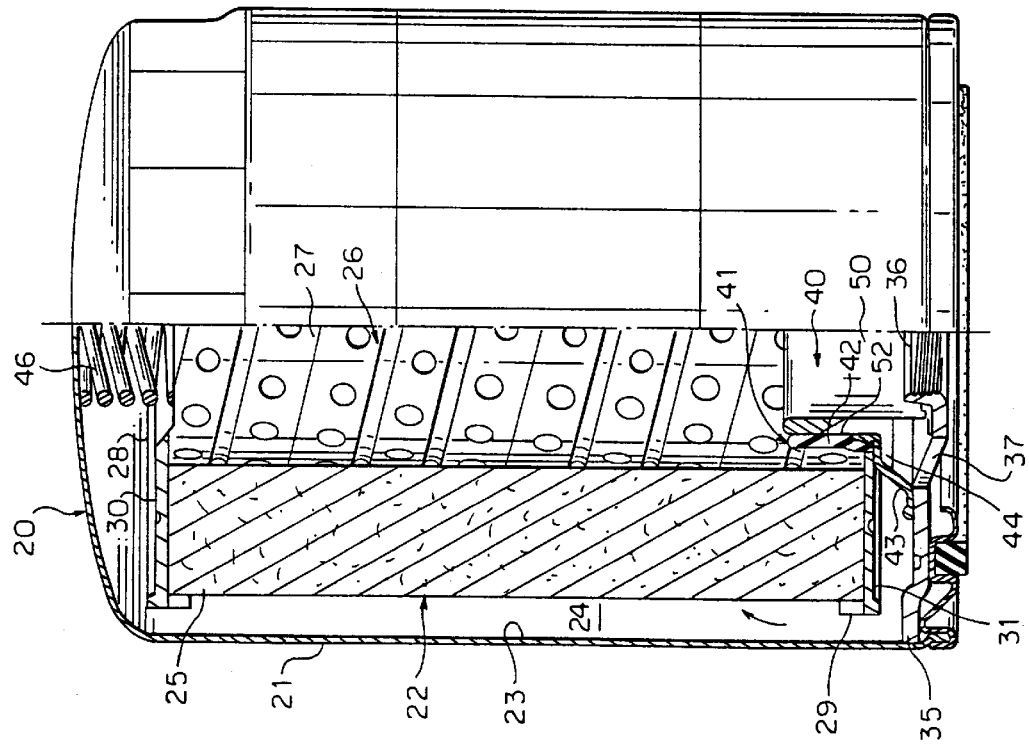
FIG. 1 is a side view partially in elevation of a lubricating oil filter cartridge having a bypass valve and a dirty side anti-drainback valve.

Referring now to FIG. 1, there is shown a filter cartridge 20 having the configuration of the filter cartridge disclosed and claimed in U.S. patent application Ser. No. 09/040,422, filed Mar. 18, 1998, now U.S. Pat. No. 6,027,640, and directed to "Improvements in Anti-Drainback/Pressure Relieved Filter Cartridges," the patent application being assigned to the assignee of this application, and being incorporated herein by reference. The filter cartridge 20 includes a housing 21 which receives a filter element 22 therein, the filter element 22 being spaced from the inner wall 23 of the housing so as to provide an annular space 24 between the filter element and the inner wall surface of the housing. The filter element 22 includes an annular filter media 25 that defines therein a hollow core 26. The filter element 22 includes a perforated support 27, which provides axial stiffness to the filter element, and a pair of end caps 28 and 29, which provide radial stiffness and end seals 30 and 31 for the filter media 25. The housing 21 is closed by an end plate 35 which has a central outlet opening 36 and a plurality of inlet openings 37 which are radially spaced from the central opening.

Mounted around the central opening 36 is a valve support 40 which has a U-shaped portion 41 projecting into the hollow core 26 which supports a resilient valve 41 that includes a collar portion 42 and skirt portion 43. The filter element 22 rests on a radial flange in the form of a shelf 44 which projects radially from the valve support 40 and is urged there against by a coil spring 46. In operation, oil enters the inlet openings 37 under pressure and flows to the annular space 24 before passing through the filter media 25 into the hollow core 26 of the filter element 22. The oil then flows out of the filter cartridge 20 through a cylindrical central passage 50 in the valve support 40. If the filter media 25 becomes clogged, the collar portion 42 of the filter 41 is forced radially outwardly by oil pressure so that the dirty oil does not pass through the filter media, but flows through openings 52 in the U-shaped portion directly into the central core 26 and out through the passage 50 in the valve support 40. In this way, the engine with which the filter is mounted still receives oil if the filter media is clogged. When the engine (not shown) on which the filter cartridge 20 is mounted is not running, oil in the annular space 24, known as dirty side oil, is retained in the cartridge 20 by the skirt 43 of valve 41 because the skirt 43 covers the openings 37.

Oil within the hollow core 26 of the filter element 22 drains out of the hollow core through the outlet opening 36 to the engine sump after passing through the engine. Consequently, there is a void in the lubricating oil circulation system of the engine. For many situations, this is not considered to cause excessive or undue engine wear, but for other situations the void is considered undesirable and possibly harmful.

Figure 2:
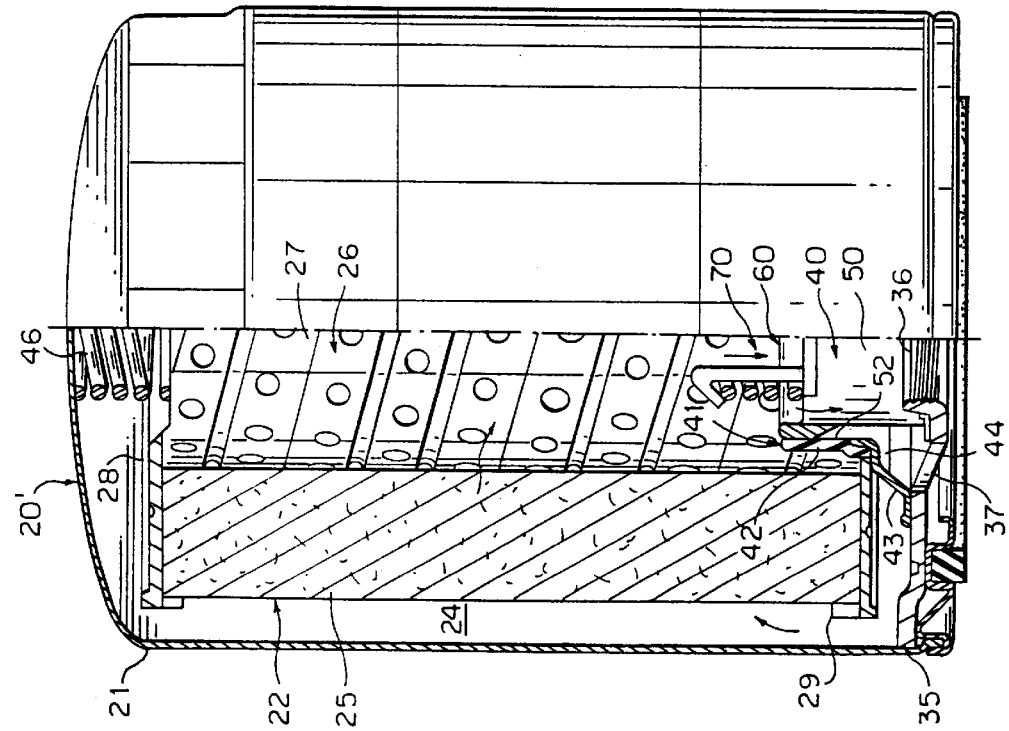
FIG. 2 is a view similar to FIG. 1, but further including a clean side anti-drainback valve inserted into the filter cartridge of FIG. 1.

Referring now to FIG. 2, a clean side anti-drainback valve 60 is incorporated into the filter cartridge 20 of FIG. 1 to provide a filter cartridge 20' so that when the engine is not running, clean side oil is also retained within the filter cartridge. When the engine is started, clean side oil is pushed by pressure in the annular space 24 and in the filter media 25 to open the clean side, anti-drainback valve 60 and flow to the engine. Consequently, there is no void in the lubricating oil circulation system due to a void in the hollow core of the filter cartridge 20'. It is emphasized that the only difference between the filter cartridge 20 of FIG. 1 and the filter cartridge 20' of FIG. 2 is the utilization of the clean side anti-drainback valve 60 shown in FIG. 2.

FIG. 3 illustrates the significance of having filter cartridges 20' which differ from the filter cartridges 20 only in that clean side anti-drainback valves 60 are incorporated therein. Note in FIG. 3 that there is an inventory 62 of filter cartridges 20 and an inventory 64 of clean side anti-drainback valves 60. There is no need to have a separate inventory of filter cartridges which have the clean side anti-drainback capability, which separate inventory is substantially different from the inventory 62. In accordance with the present invention, when it is necessary to provide a supply of filter cartridges 20', the clean side anti-drainback valves 60 are simply inserted into some of the cartridges 20, as those cartridges are being assembled, so that a supply of cartridges 20' is produced. Accordingly, there is one main assembly line with a branch 66, at which branch the clean side anti-drainback valves 60 are incorporated into the filter cartridges 20 to produce the filter cartridges 20'.

Figure 5:
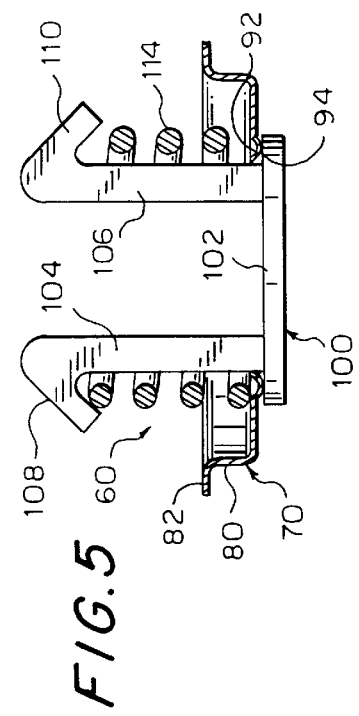
FIG. 5 is a side view, partially in section, of a clean side anti-drainback valve assembly.
Figure 7:
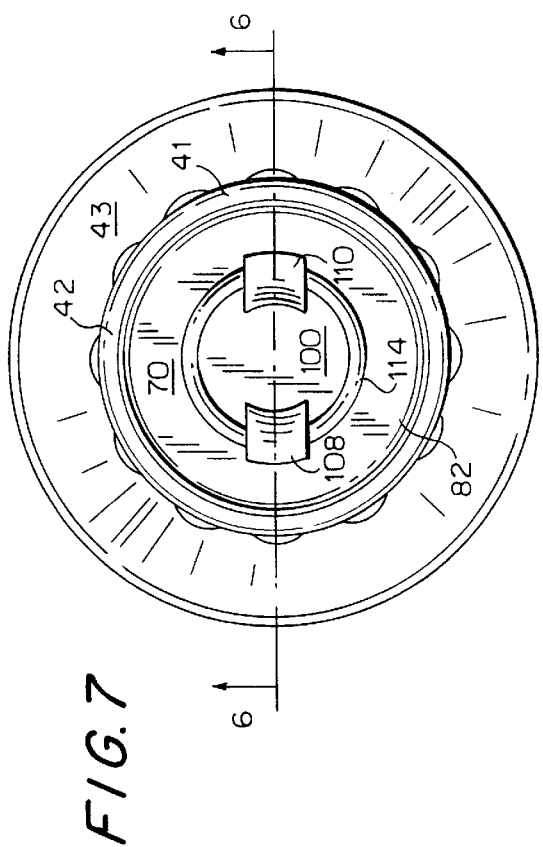
FIG. 7 is a top view of the valve assembly of FIG. 6.
Figure 4:
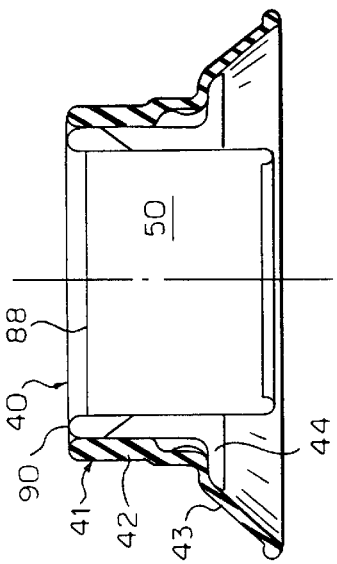
FIG. 4 is a side elevation of a valve assembly including a valve support, and a valve member wherein the assembly provides bypass capability dirty side anti-drainback capability, to the filter cartridges of FIGS. 1–3.
Figure 6:
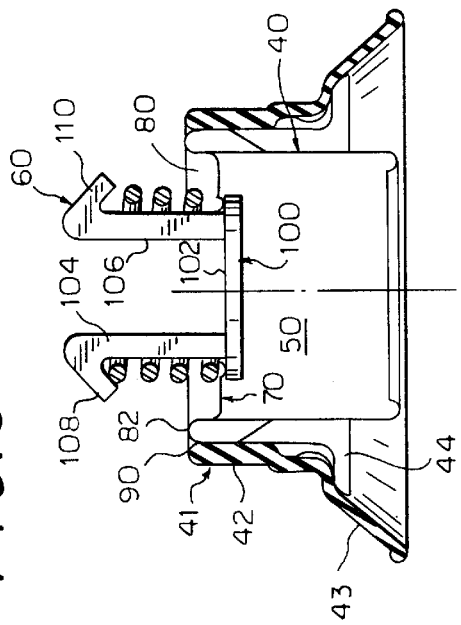
FIG. 6 is a side view showing the valve assembly of FIG. 5 combined with the valve assembly of FIG. 4.

In order for an arrangement such as that of FIG. 3 to work, the clean side anti-drainback valves 60 must be configured to readily and conveniently fit into the filter cartridges 20. Referring now to FIGS. 4–7, it is seen that the valve support 40, having the cylindrical central passage 50, is a separate element separably inserted into the housing 21 for supporting the filter element 42 on the plate 35, while providing the dirty side anti-drainback capability, as well as the bypass capability. The details of the valve assembly configured of the valve support 40 and the valve member 42 are set forth in the aforementioned patent application Ser. No. 09/040,422, incorporated herein by reference. In order to convert the filter cartridge 20 into the filter cartridge 20' of FIG. 2, the clean side anti-drainback valve 60 of FIG. 5 is inserted into the cylindrical passage 50 of the valve support 40, as is shown in FIG. 6. This composite valve assembly having both clean side and dirty side anti-drainback capabilities as well as bypass capabilities forms a separate valve assembly 70 which is inserted into the housing 21 instead of the valve assembly of FIG. 4 in order to produce the filter cartridge 20' of FIG. 2.

Figure 8:
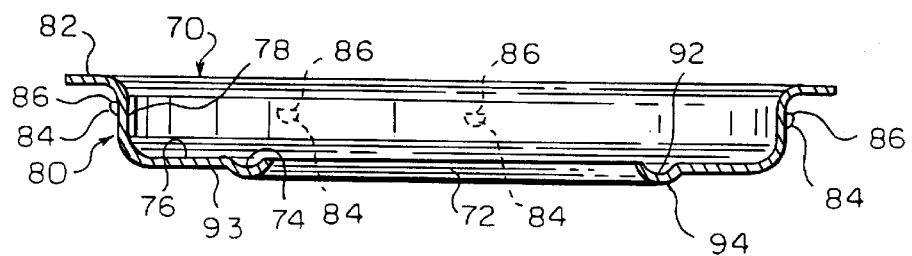
FIG. 8 is a side elevation of a valve seat used with the clean side anti-drainback valve assembly of FIG. 5.

Referring now to FIG. 8, a valve seat 70 is shown for mounting the valve 60 on the valve support 40. The valve seat 70 is annular in shape and includes a central opening 72 surrounded by a channel 74 in a base 76, which base has a rim 78 so as to define a dish portion 80 of the valve seat. Surrounding the dish portion 80, is a radially extending peripheral flange 82. Optionally, the rim 78 may have a plurality of detents 84 therein which have shoulders 86 that engage beneath a land 88 (see FIG. 4) so that the valve seat 70 is positively held within the passage 50 of the valve support 40 with the peripheral flange 82 resting on the top surface 90 of the valve support (see FIGS. 4 and 6). Alternatively, the valve seat 70 can be frictionally retained within the passage 50 or may be held therein with an oil resistant adhesive. The base 76 of the valve seat 70 has a first surface 92 facing outwardly toward the hollow core 26 and a second face 93 facing into the passage 50.

Figure 9:
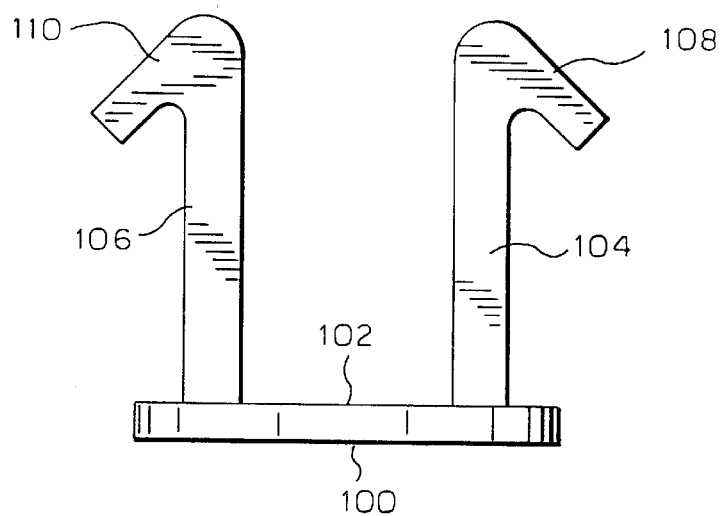
FIG. 9 is a side view of a valve element used with the valve seat of FIG. 8.
Figure 10:
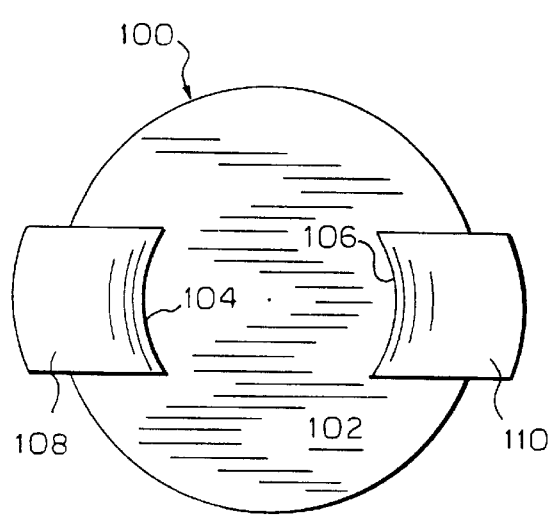
FIG. 10 is a top view of the valve element of FIG. 9.
Figure 11:
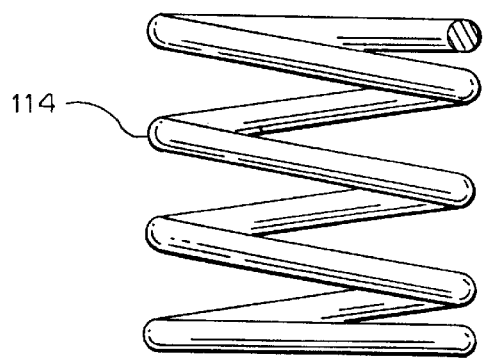
FIG. 11 is a side view of a coil spring used with the valve seat of FIG. 8 and the valve element of FIGS. 9 and 10 to produce the clean side valve assembly of FIG. 5.

Referring now to FIGS. 9 and 10, there is shown a valve element 100 which includes a valve plate 102 and a pair of J-shaped struts 104 and 106. The J-shaped struts have crooks 108 and 110, respectively, which extend over the plate 102 in an outwardly radial direction. A coil spring 114 is placed around the struts 104 and 106 as is seen in FIG. 5 with one end seated within the crooks 108 and 110, and the other end bearing against the valve seat at the outwardly facing surface 92 thereof, which faces into the hollow core 26 of the filter element 22 (see FIG. 2). The valve plate 100 bears against the surface 94 which faces the passageway 50 and the central outlet 36 of the filter cartridge 20'.

Since the coil spring 114 biases the cover plate 102 of the valve element 100 to close the opening 72 through the valve seat 70, clean side oil in the hollow core 26 of the filter element 22 is retained in the filter cartridge 20' unless the oil is pressurized by starting and running the engine (not shown). When the engine is started, oil pressure in the annular space 24 pushes oil through the filter media 25 toward the hollow core 26, which oil then applies pressure against the valve plate 102 so as to overcome the bias of the coil spring 114 to keep the anti-drainback valve closed, thereby allowing the clean, filtered oil to flow into the central passage 50 and out central opening 36 in the filter cartridge 20'.

From the foregoing description, one skilled in the art can easily ascertain the essential characteristics of this invention, and without departing from the spirit and scope thereof, can make various-changes and modification of the invention to adapt it to various usages and conditions.

I claim:

1. A clean side anti-drainback valve in combination with a filter cartridge having an annular filter element with a hollow core, the annular filter element supported on an annular valve support having an upper surface and defining a passage leading out of the filter cartridge, the anti-drainback valve comprising:

an annular valve seat having a central opening, a base, and a peripheral flange, said peripheral flange mounted atop said upper surface of the annular valve support with the central opening in alignment with the passage leading out of the filter cartridge;

a valve mounted on the valve seat for movement between a first position where it closes the passage through the valve seat and a second position in which it opens the passage through the valve seat; and a biasing device disposed between the valve and valve seat for urging the valve to the first position, and the filter cartridge comprising:

the valve support disposed in the hollow core of the annular filter element and having an annular surface upon which the annular valve seat is supported.

2. The clean side anti-drainback valve of claim 1, wherein the valve seat has a dish portion between the central opening and peripheral flange, which dish portion is adapted to seat within the passage defined by the annular valve support leading out of the filter cartridge with the peripheral flange engaging the annular valve support and extending radially outside of the passage.

3. The clean side anti-drainback valve of claim 2, wherein the valve comprises a first portion which covers the opening through the valve seat and a second portion which projects axially from the first portion, the second portion including a spring seat which faces the valve seat, and wherein the biasing device is a spring disposed between the valve seat and spring seat for urging the valve toward the first portion so that it engages the valve seat to close the opening.

4. The clean side anti-drainback valve of claim 3, wherein the valve seat has a first surface which is adapted to face away from the passage when the valve seat is mounted on the valve support and a second surface which is adapted to face into the passage when the valve seat is mounted on the valve support, and wherein the spring engages one of the surfaces while the first portion of the valve engages the other surface.

5. The clean side anti-drainback valve of claim 4, wherein the second portion of the valve comprises two struts attached to the first portion with the spring seat formed thereon at a location spaced from the first portion.

6. The clean side anti-drainback valve of claim 5, wherein the struts are J-shaped and the spring seat is formed at the crook of the "J".

7. The clean side anti-drainback valve of claim 6, wherein the valve seat is held on the valve support with the valve seat within the passage leading out of the filter cartridge by positive engagement between an outside surface of the dish portion and an inside surface of the valve support.

8. The clean side anti-drain back valve of claim 7, wherein the positive engagement is a friction fit.

9. The clean side anti-drainback valve of claim 7, wherein the positive engagement includes a snap fit provided by interacting detents on the dish portion and valve support.

10. The clean side anti-drainback valve of claim 7, wherein the positive engagement is provided by an adhesive.

11. The clean side anti-drainback valve of claim 1 wherein the annular valve support has a U-shaped portion which extends into the hollow core of the filter element with the annular surface that supports the annular valve seat being a bypass defined by the U-shaped portion.

12. The clean side anti-drainback valve of claim 11 wherein the filter cartridge with which the clean side anti-drainback valve is combined includes a dirty-side anti-drainback valve supported on a radial flange and a bypass valve supported on the U-shaped portion.

* * * * *